United States Patent
Delons

(10) Patent No.: US 7,240,440 B2
(45) Date of Patent: Jul. 10, 2007

(54) INSTALLATION FOR DRYING WASTE, IN PARTICULAR WASTEWATER PURIFYING SLUDGE

(75) Inventor: Luc Delons, Rueil Malmaison (FR)

(73) Assignee: Degremont, Rueil-Malmaison (FR)

( * ) Notice: Subject to any disclaimer, the term of this patent is extended or adjusted under 35 U.S.C. 154(b) by 29 days.

(21) Appl. No.: 10/525,506

(22) PCT Filed: Aug. 26, 2003

(86) PCT No.: PCT/FR03/02583

§ 371 (c)(1),
(2), (4) Date: Mar. 18, 2005

(87) PCT Pub. No.: WO2004/020921

PCT Pub. Date: Mar. 11, 2004

(65) Prior Publication Data

US 2005/0246919 A1    Nov. 10, 2005

(30) Foreign Application Priority Data

Aug. 28, 2002 (FR) .................................. 02 10692

(51) Int. Cl.
*F26B 19/00* (2006.01)
*F26B 3/00* (2006.01)

(52) U.S. Cl. .................... 34/93; 34/69; 34/565; 34/571
(58) Field of Classification Search .................. 34/576, 34/582, 586, 69, 93, 522, 565, 570, 571
See application file for complete search history.

(56) References Cited

U.S. PATENT DOCUMENTS 3,981,803 A * 9/1976 Coulthard .................... 210/178
4,230,531 A   10/1980 Fernandopulle
5,001,846 A   3/1991 Andrassy

FOREIGN PATENT DOCUMENTS

DE      3118947 A1 * 12/1982
DE      43 15 321 A   11/1994
DE      43 31 820 A   3/1995

* cited by examiner

*Primary Examiner*—Jiping Lu
(74) *Attorney, Agent, or Firm*—Connolly Bove Lodge & Hutz LLP

(57) ABSTRACT

The system dries pasty or powdery products such as sludge from wastewater purifying stations, the drying occurring in a chamber receiving the products to be dried. The system includes a greenhouse with translucent or transparent walls erected on a slab upon which a bed of products to be dried is deposited. At least one wind generator is provided for generating energy which is converted to heat that is delivered to the slab upon which the bed of products to be dried is spread.

2 Claims, 2 Drawing Sheets

INSTALLATION FOR DRYING WASTE, IN PARTICULAR WASTEWATER PURIFYING SLUDGE

FIELD OF THE INVENTION

Figure 1:
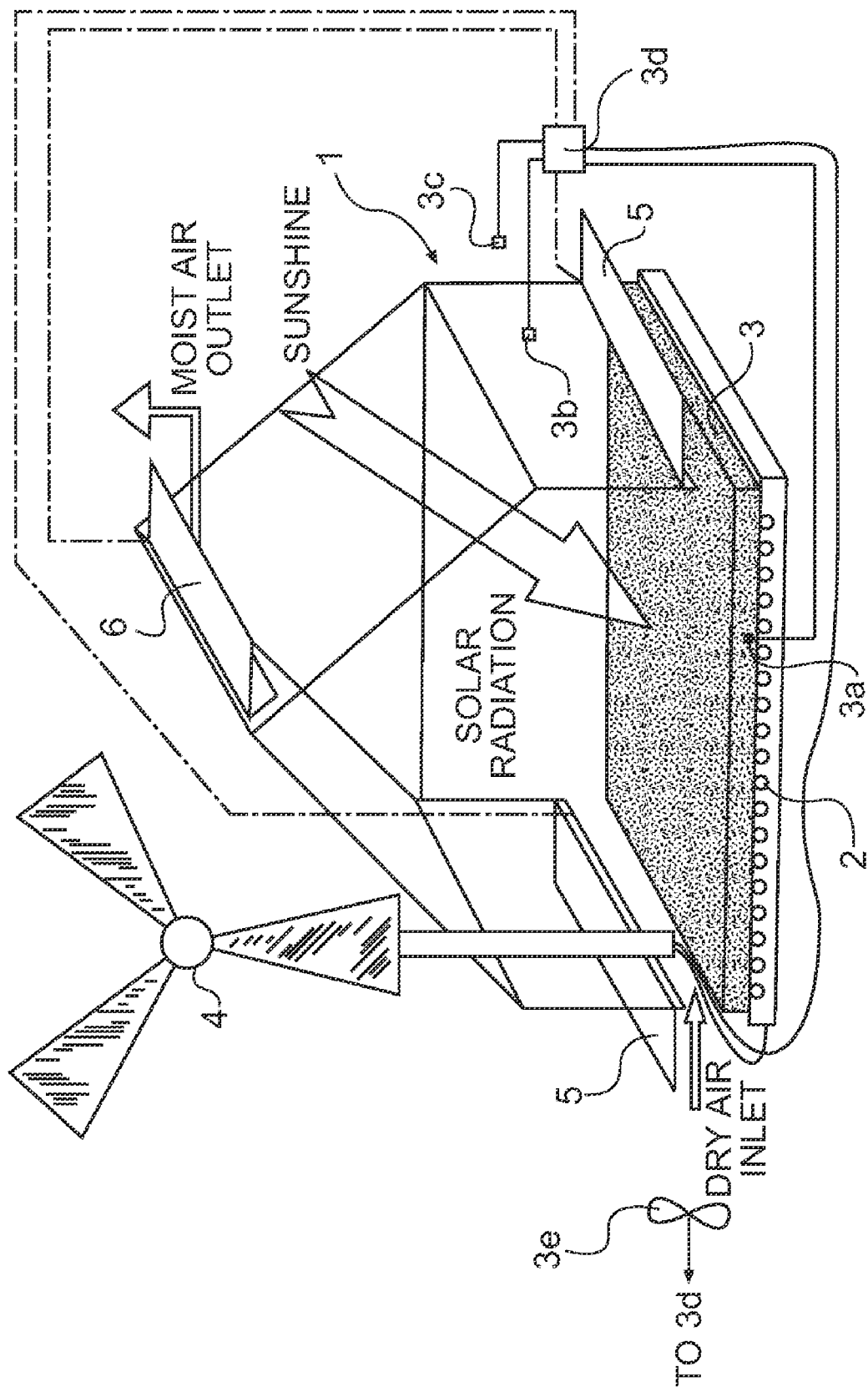

The present invention relates to the drying of waste, particularly of sludge from water purifying treatment, and it proposes to provide a drying device employing two renewable energy sources: solar energy and wind energy.

BACKGROUND OF THE INVENTION

This invention applies in particular, without being limited thereby, to the drying of biological sludge from urban and/or industrial wastewater purifying stations.

The present invention is vitally important at a time when, throughout the world, research and applications are being developed on techniques which serve to conserve fossil energy resources and to control global warming due to the greenhouse effect.

A person skilled in the art knows that purification sludge is an inevitable waste produced by water treatment: every individual produces an average of 20 kilograms per year thereof, representing more than 10 million metric tons per year for Europe, expressed as dry matter, representing a 5 times larger figure when applied to so-called wet sludge, which consists of 20% dry matter and 80% water.

At the present time, this sludge can be disposed of in several ways, in particular: dumping, incineration and agricultural spreading. However, owing to numerous constraints (in particular technical, health, regulatory) these sludge disposal systems are increasingly complex, hence increasingly expensive, and even liable to criticism and indeed prohibited locally.

At all events, drying the sludge is an unavoidable step in the wastewater treatment system, because it serves to reduce the volumes to be stored by a factor of 4, facilitating transport and disposal. This drying clearly represents a rapidly growing market today.

The prior art in this field can be summarized as follows:

Thermal drying: this technique uses conventional energy (gas, oil, electricity) as well as specific equipment to transfer energy to the sludge and to evaporate the water present therein. The application of this technique requires large-scale installations, incurring large investments and consuming colossal amounts of energy (1 megawatt per metric ton of water evaporated) which also generate highly polluted condensates which must then be retreated at considerable expense.

Composting: this natural, long-established method, using thermophilic fermentation of the carbonaceous organic matter in the presence of air, causes a heat release that permits partial dehydration of the water present in the sludge. This is a simple method, easy to apply, economical, and capable of yielding a high-grade product. However, it is ineffective for reducing the volume of the sludge, because the drying is only partial and requires the addition of structuring co-products (bark, sawdust, green waste, etc).

Solar drying: this technique is starting to be developed in the field of sludge drying because it is suitable for building simple, economical and ecological installations. However, it presents the major drawback of requiring large greenhouse areas, incurring very large and hence costly investments, as well as problems of layout, thus being limited to rural areas and low-capacity stations.

So far, it has not been possible, on an industrial scale, to build drying installations that make use of wind energy. This is because the generation of energy by wind generator to supply a conventional sludge drying installation is uncompetitive. Furthermore, hybrid solutions (gas compression, heat pumps) have limited capacity and are only feasible for very small installations. A further drawback of wind energy is that it is not constantly available, therefore requiring oversized drying equipment (by a factor of at least 2), which would lead to uncompetitive solutions.

BRIEF DESCRIPTIONS OF THE INVENTION

Based on that prior art, the present invention proposes a solution that corrects the above mentioned drawbacks, while permitting the construction of competitive sludge drying installations, of limited area, consuming no other energy than renewable energies, and permitting an effective reduction of the sludge volume.

This technical problem is solved by a device for drying pasty or powdery products such as waste and more particularly sludge from wastewater purifying stations, in a chamber receiving the products to be dried, and which is provided with means for turning over and routing said products, this device being characterized in that it comprises a translucent or transparent greenhouse, erected on a slab upon which the bed of products to be dried is deposited, this slab being equipped with said turning over and routing means, and further comprises one or more wind generators generating energy which is degraded in the form of heat which is restored in the slab upon which the bed of products to be dried is spread.

As may be understood, the device according to the invention allows drying at the surface and at the bottom portion of the product to be dried, by implementing two drying techniques respectively:

solar drying, which is obtained by heating the surface of the bed of products to be dried, by the solar radiation passing through the transparent or translucent walls of the greenhouse;

wind drying: wind generators generate energy for heating the bottom portion of the products to be dried. This effect can be obtained:

either simply by a wind generator generating electricity that supplies resistors embedded in the slab supporting the greenhouse;

or in a more complex manner, by using a heat pump which is actuated by the wind generators, the hot source heating the slab and the cold source being used to lower the moisture content of the scavenging air.

Other features and advantages of the present invention will appear from the description provided below with reference to the drawings appended hereto in which:

BRIEF DESCRIPTIONS OF THE FIGURES

Figure 2:
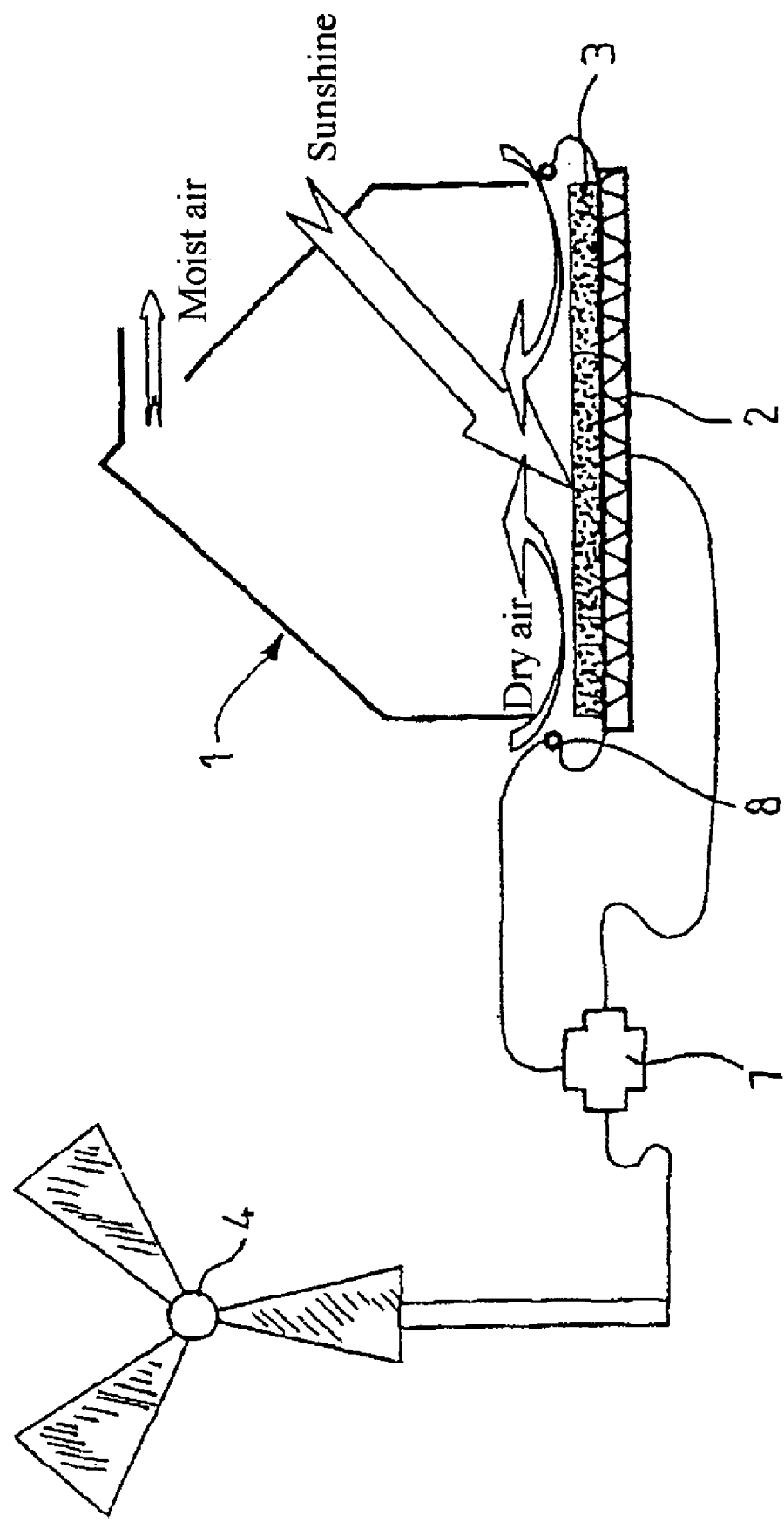

FIG. 1 is a schematic perspective view showing an embodiment of an installation according to the invention, and FIG. 2 is an elevation view showing a variant of this installation.

Reference should be made first to FIG. 1. In this figure, it may be observed that, in this non-limiting embodiment, the drying installation according to the invention comprises:

a greenhouse 1 having walls made of translucent or transparent plastic, allowing the passage of solar radiation and resting on a heating slab or floor 2 upon which the bed 3 of products to be dried is spread, for example biological sludge from water purifying stations. The products to be dried are disposed in a thin layer, that is with a thickness of about 20 to 100 cm. As mentioned below, this floor 2 further comprises means for turning over and routing the products to be dried, and at least one wind generator 4 generating energy restored in the form of heat for heating the slab 2.

In the embodiment shown in FIG. 1, the wind generators such as 4 generate electricity to supply a battery of electrical resistors embedded in the slab 2 and capable of dissipating, in this slab, the maximum power supplied by the wind generators.

The installation further comprises ventilation means combining natural ventilation with intermittent forced ventilation 3e. It also comprises regulating means comprising sensors measuring the temperature of the sludge 3 to be dried 3a, the air temperature respectively 3b inside and outside the greenhouse 1 and the humidity of this air 3c, these various sensors actuating mobile louvers 5 and 6 which are provided on the walls of the greenhouse, respectively at the bottom and top portion thereof, in order to regulate the natural convection which removes the moisture-laden air, either naturally or by forced ventilation. This system can be supplemented by programming and automation means 3b, making it possible, for example, to program a week of operation.

As regards the means which are provided in the heating slab or floor 2, for the turning over and routing of the product to be dried, they can be provided, for example, in the form of rotating rollers, equipped with toothed harrows serving to break up the bed of sludge to be dried 3, transporting said sludge from the inlet to the outlet of the greenhouse, while turning it over and aerating it.

The equipment of the installation according to the invention described above, which provides, on the one hand, the turning over and routing of the product to be dried and, on the other, the forced ventilation, can be supplied with wind energy whereof they would only use about 10% of the capacity normally provided on the installation. In case of "wind deficit", energy from the electrical grid would be used in case of peri-urban installation, or photovoltaic panels could be used in a remote rural environment.

Reference should now be made to FIG. 2, which shows a variant of the installation according to the invention. This variant comprises the same means as those described above with reference to FIG. 1, the only difference being due to the fact that it uses a heat pump.

This embodiment serves to make the installation according to the invention more effective, particularly in windy and humid areas, for example in oceanic maritime climates.

The wind generators such as 4 actuate a heat pump (7) comprising a compressor and two heat exchangers: one (hot source) transfers heat to the slab 2 in order to heat the bottom portion of the bed 3 of material to be dried, the second 8 (cold source) condenses the moisture in the air entering the greenhouse 1, thereby permitting the scavenging of this air with dry unsaturated air, thereby increasing the efficiency of the installation.

An example is given below of the application of an installation according to the invention, highlighting the technical advantages and effects that it procures, in comparison with conventional drying installations.

This installation is used for treating the effluents of a city of 20,000 inhabitants. Sludge production is 400 metric tons per year of dry matter (20 kg per capita), or 2,000 metric tons of sludge with a dryness of 20% (hence containing 80% water). This dryness is such as conventionally obtained by mechanical dehydration. The drying installation according to the invention comprises a greenhouse having an area of 700 $m^2$ and a wind generator with a rated capacity of 100 kW supplying a battery of electrical resistors embedded in the slab 2. This installation is suitable for obtaining sludge with a dryness of 75% or more.

A conventional drying installation for obtaining a dryness comparable to that obtained by the installation according to the invention would present the following features, depending on the technique applied:

thermal drying: in continuous operation this would consume 200 kWh of natural gas, fuel oil or electricity for 8,000 hours per year.

composting: this would require 4,000 metric tons of structuring co-products (for example sawdust);

solar drying: this would require a greenhouse with an area of 1,500 $m^2$.

The invention further provides the following supplementary advantages:

the cost of construction of an installation according to the invention is about the same as for conventional drying installations, whether thermal drying or composting;

on the contrary, the operating cost is reduced by a factor of 5, due to the non-use of fossil energy (direct or indirect thermal drying) or of co-products (composting), and the mechanical maintenance and manpower costs are furthermore significantly reduced in the case of the invention;

finally, the ground area of an installation according to the invention can be half that of a solar drying installation, due to the additional energy provided by wind energy.

It must be clearly understood that this invention is not limited to the embodiments described and/or mentioned above, but includes all the variants thereof. In particular, the drying installation could comprise a plurality of corridors operating in series or in parallel, as well as a plurality of wind generators supplying heating networks in predetermined zones. Similarly, as already mentioned above, the installations according to the invention can be applied to the drying of products other than purification sludge: for example for wet waste, for pasty or powdery products or even to evaporate solvents other than water.

The invention claimed is:

1. A system for drying sludge from wastewater purifying stations, the drying occurring in a chamber receiving the products to be dried, the system comprising:

a greenhouse with translucent or transparent walls erected on a slab upon which a bed of products to be dried is deposited;

at least one wind generator generating electrical energy which is converted to heat that is delivered to the slab upon which the bed of products to be dried is spread; and regulating means having sensors measuring the temperature of the bed of products to be dried, the air temperature respectively inside and outside the greenhouse and the humidity of the air, these sensors actuating mobile louvers provided, respectively, in the top portion and in the bottom portion, on the walls of the greenhouse in order to regulate the natural convection removing moisture laden air.

2. The installation as claimed in claim 1, further comprising programming and automation means.

* * * * *